April 26, 1927.
C. H. BRASELTON ET AL
1,625,789
LIQUID PUMPING APPARATUS
Original Filed Feb. 18, 1922
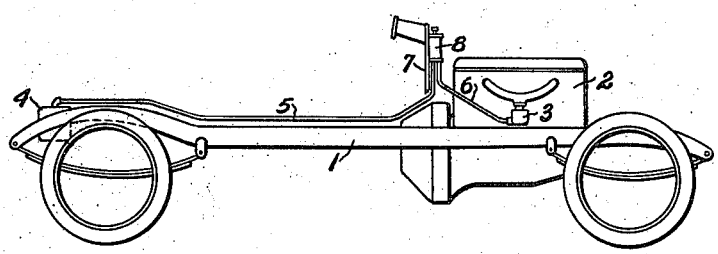
Fig. I.
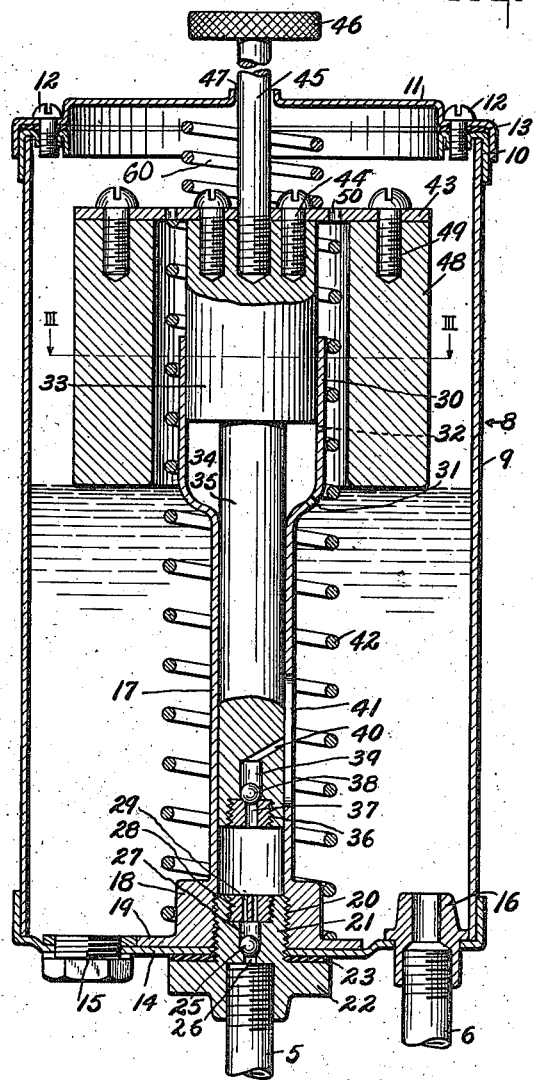
Fig. II.
Fig. III.
INVENTORS
Chester H. Braselton
Fred B. MacLaren
BY
Chester H. Braselton ATTORNEY Patented Apr. 26, 1927.

1,625,789

UNITED STATES PATENT OFFICE.

CHESTER H. BRASELTON, OF NEW YORK, AND FRED B. MacLAREN, OF MALBA, NEW YORK; SAID MacLAREN ASSIGNOR TO SAID BRASELTON.

LIQUID-PUMPING APPARATUS.

Application filed February 18, 1922, Serial No. 537,584. Renewed August 19, 1926.

This invention relates to improvements in liquid pumping apparatus of a character adapted to be operated by vibrations imparted to the apparatus, being particularly adapted for use in fuel feed apparatus for automotive vehicles. The invention is a modification of our co-pending applications Serial No. 533,493, filed February 1, 1922, and Serial No. 532,718, filed January 30, 1922, in which we reserve the right to broad claims on the invention.

One of the objects of the invention is the provision of a means for the above purpose which shall be of simple construction, small cost, and of a nature not likely to get out of order easily.

Another object is the provision of a novel means for dampening the action of the apparatus automatically whenever the amount of liquid pumped reaches a predetermined quantity.

Other objects, and objects relating to details of construction and economies of manufacture will appear as we proceed with the description of the embodiment of the invention which, for the purposes of the present application, we have illustrated in the accompanying drawing, in which:

Figure I is a diagrammatic side elevational view of an automobile equipped with our improved apparatus.

Figure II is a vertical central sectional view of the high level tank and pump.

Figure III is a cross section taken substantially from the line 3—3 Figure II and looking in the direction of the arrows.

Referring to Figure I there is shown at 1 the frame of an automobile having an internal combustion engine 2 with a carburetor 3. The main fuel tank 4 ordinarily mounted at the rear of the car is connected by a conduit 5 with a high level auxiliary tank 8 which is rigidly mounted upon the vehicle, preferably upon the forward side of the dash 7. Leading from the base of the tank 8 is a conduit 6 which provides a passage for fuel from the tank to the carburetor 3.

The tank 8 is formed preferably of a cylindrical shell 9 to the upper edge of which is secured an annular member 10 having an inwardly extending flange. Upon this flange is mounted the tank cover 11, screws 12 extending through the latter into threaded openings in the flange of the annular member 10. A gasket 13 is provided to prevent any possible leakage of liquid on account of splashing.

The bottom 14 of the tank has an opening therethrough for the drainage of sediment, which opening is normally closed by a threaded plug 15. A nipple 16 mounted in the tank bottom serves as a connection with the conduit 6 and extends upwardly into the tank for a short distance so as to be above the impurities which settle at the base of the tank.

The pump cylinder 17 is arranged preferably axially of the tank. It is provided near its base with an enlargement 18 and a flange 19 resting upon the tank bottom 14. The enlargement 18 is internally threaded at 20 to receive a connecting plug 21 by means of which the cylinder is fixed to the tank. The plug 21 has an annular shoulder 22 supporting a gasket 23 to provide a fluid tight joint. Within this plug is a gravity actuated ball check 25 normally closing the small passage 26 from the conduit 5. The ball 25 is movable in a chamber 27, its upward motion being limited by a small plug 28 threaded into the larger plug 21, this plug 28 being provided with a series of passages 29 connecting the chamber 27 with the interior of the pump cylinder.

The upper end of the cylinder 17 has an enlargement 30 provided with a fuel passage 31. There may also be an air vent 32 to the enlargement 30. A cylindrical weight 33 has a sliding fit within the enlargement 30, the space 34 beneath this weight constituting a dampening chamber. The weight 33 surmounts a pump piston 35 which has a sliding fit within the cylinder 17. Into the lower end of the piston 35 is threaded a plug 36 having a passage 37 at the upper end of which is a seat for a ball check 38 movable vertically in a chamber 39 which communicates with a passage 40 leading outwardly through the piston to a vertically elongated opening 41 in the pump cylinder 17.

In order to yieldably maintain the pump cylinder and pump piston in predetermined relative relation to each other we employ a coil spring 42 fitting closely about the enlargement 18 at the base of the pump cylinder and bearing at its upper end against a plate 43 secured to the top of the cylindrical weight 33 by means of a plurality of screws 44.

A pin 45 threaded into the cylindrical weight 33 and provided at its upper end with a knurled head 46 extends through an opening 47 in the tank cover 11, the opening being of slightly larger diameter than the pin 45 in order to provide an air vent and also to reduce friction.

In addition to the cylindrical weight 33 we prefer to employ also an annular weight 48 supported from the plate 43 by means of screws 49. We have found by experiment that the combined mass of weights and piston should be equal to or greater than about 7 pounds for each square inch of piston area in order to effect the best results. We have also found by experiment that the spring 42 should be of such proportions as to be deflected not less than 3 inches when subjected to the pressure of the weights and piston.

It is desirable that the plate 43 have one or more vents 50 therein to connect the air space between the two weights with the space above the plate.

Because of the relatively high inertia of the piston with its weights the piston tends to remain at a fixed elevation while the tank with the pump cylinder moves up and down in response to the vibrations of the vehicle. By virtue of this relative motion between the pump cylinder and piston fuel is raised from the main tank 4 through the conduit 5 and up through the pump passages and valves into the auxiliary tank 8 from which it flows as needed to the carburetor 3. When the level of fuel in the tank 9 reaches the passage 31 in the enlargement at the upper end of the pump cylinder fuel flows through that passage into the chamber 34, the air thus displaced in the chamber 34 escapes through the vent 32, if such a vent is provided, or otherwise through the small clearance between the weight 33 and the enlargement 30. The fuel thus collected in the chamber 34 acts quite effectively to dampen the relative motion between the cylinder and piston, as the passage 31 is not large enough to permit the free flow of fuel out of the chamber 34 when the relative motion between the cylinder and pump tends to reduce the size of the chamber 34. In the manner described, pumping action continues rapidly until the desired level of fuel in the tank is attained, after which pumping occurs only as the level tends to become lowered on account of fuel drawn to the carburetor to satisfy the requirements of the engine.

In order to take up rebound induced by sudden movement of the weight 33, we utilize a second coil spring 60 surrounding the pin 45 and lying intermediate the piston plate 43 and top cap 11. This spring smoothes out the oscillations and causes a proper return of the piston when displaced upwardly. The spring 60 has a different natural frequency from that of coil 42 brought about by its smaller coil and wire diameter, thus securing a quick and positive control over the piston movement.

We claim as our invention:

1. In a fuel feed apparatus for automotive vehicles, a high level tank, a pump cylinder within and attached to said tank, a conduit leading from the bottom of said cylinder to a source of fuel supply, a pump discharge passage connecting said cylinder and tank, a piston in said cylinder possessing relatively high inertia, yieldable means tending to hold said piston and cylinder in predetermined relative positions, said cylinder having an enlargement near its upper end with a small fluid passage therethrough and said piston having an enlarged portion movable within the enlarged portion of the cylinder, whereby the movement of the piston is dampened as liquid collects in said cylinder enlargement.

2. In a fuel feed apparatus for automotive vehicles, a high level tank, a vibration operated pump located within the tank, said pump comprising a cylinder having an enlarged upper portion and a piston having a correspondingly enlarged upper portion, said cylinder enlargement having a small passage therethrough, whereby movement of the piston due to vibration of the vehicle is dampened as liquid collects in said cylinder enlargement.

3. In a fuel feed apparatus for automotive vehicles, a high level tank, two elements, namely a pump cylinder and a pump piston located within said tank, one of said elements being attached to the tank, the other of said elements possessing relatively high inertia, yieldable means tending to hold said elements in predetermined relation to each other, the upper portions of said two elements being formed to provide an annular space between them, the outer one of said elements having a small opening therethrough, whereby relative movement of the two elements is dampened as liquid collects in said annular space.

4. In a fuel feed apparatus for automotive vehicles, a high level tank, a vibration operated pump located within the tank, said pump comprising an upright cylinder and piston one of which is attached to the bottom of the tank and the other of which possesses relatively high inertia, and resilient means between the said last named element and the top of the tank to take up rebound and resilient means having a natural frequency differing from that of the first named resilient means adapted to vibrate said piston.

5. In a fuel feed apparatus for automotive vehicles, a high level tank, a pump cylinder within and attached to the tank, a conduit leading from the bottom of said cylinder to a source of fuel supply, a pump discharge passage connecting said cylinder and tank, a piston slidable within said cylinder and provided at its upper end with a central cylindrical weight and an annular weight concentrically spaced therefrom, said pump cylinder having an enlargement at its upper end to slidably receive said cylindrical weight, said enlargement having a small opening therethrough and yieldable means tending to maintain said piston at a predetermined height.

6. In pumping mechanism, the combination of a tank; a vibration operated pump within the tank, said pump comprising a cylinder; a piston movable within the cylinder; a weighted mass connected with the piston and movable therewith; resilient supporting means for said weighted mass for maintaining the same at a point of balance; and additional resilient means operatively connected with said weighted member, the natural period of one of said resilient means differing from that of the other.

7. In pumping mechanism of the class described, the combination of a tank; a vibration operated pump within said tank; means for dampening the movement of the pump after a predetermined amount of liquid has been pumped into the tank; and a plurality of resilient members operatively connected to the movable elements of said pump, the natural frequency of said resilient means differing one from the other.

In testimony whereof, we affix our signatures.

CHESTER H. BRASELTON.
FRED B. MacLAREN.